April 1, 1958           W. J. BRETT           2,829,213

BACK-UP SAFETY SIGNAL FOR AUTOMOTIVE TRUCKS

Filed Dec. 27, 1955

INVENTOR.
WILLIAM J. BRETT
BY
*Geler & Leonard*
*his* ATTORNEYS.

United States Patent Office 2,829,213
Patented Apr. 1, 1958

2,829,213

BACK-UP SAFETY SIGNAL FOR AUTOMOTIVE TRUCKS

William J. Brett, Cleveland, Ohio

Application December 27, 1955, Serial No. 555,471

2 Claims. (Cl. 200—61.88)

This invention relates to a safety signal and particularly to a back-up safety signal for use on self propelled vehicles.

For purposes of illustration, the present invention is described hereinafter as applied to automotive trucks, its use with other self propelled vehicles being readily apparent from the illustrative expression.

The noise of general operations conducted in the vicinity of the loading ramps and work sites of factories is such that the noise caused by the ordinary operation of an automotive truck is not noticeable. On the contrary, the noise caused by such an automotive truck loses its identity in the general overall noise. Nevertheless, it is necessary that automotive trucks be operated in factory buildings where other equipment is operating, and, quite often, it is necessary that the trucks be backed up to the work-site for receiving or discharging loads.

Such a backing operation is very hazardous unless some type of safety warning signal, such as a blinking light or a strident horn, is provided. Whatever signal device is used, intermittent operation appears to be more effective than continuous operation.

Many attempts have been made heretofore to provide safety signal devices which can be operated during backing of trucks to which they are attached. As an example, an electrically operated signal controlled manually by a switch which must be set by the operator has been suggested. Such a system has the disadvantage, however, that the operator inadvertently may fail to operate the switch and thus back-up the truck without causing the signal to operate. Obviously, if the workmen have been led to expect such a signal, any failure of its operation aggravates the general danger against which the signal was originally meant to warn, and can result in entrapment of the workmen.

Accordingly, to assure operation at the proper time, signal operating switches have been arranged so that the ordinary external, normally operable gear shift levers of the trucks engage and operate the switches when the levers are shifted to position for reverse drive.

Such an arrangement operates successfully for a short interval but due to the springing or bending of the gear shift lever, the lever soon fails to cooperate properly with the switch with the result that, unknown to the operator of the truck, the signal fails to operate. As mentioned, in such a case greater danger to the workmen is caused than would have existed had the workmen and truck operator known that no backing signal had been provided on the truck.

The problem remains, therefore, of providing a simple and effective back-up signal system which, being a safety feature, is unlikely ever to fail in operation.

The present invention provides a combination in which is incorporated a safety back-up signal system so arranged that the possibility of its failure to operate is negligible, yet which can be readily applied to any conventional automotive truck without any appreciable change in the existing structure of the truck itself.

The safety signal of the present invention is one in which advantage is taken of existing parts of the vehicle structure which afford a means of operation which is essentially foolproof regardless of the abuse to which the truck in general, and the gear shift lever in particular, may be subjected by the operator.

Various objects and advantages of the present invention will become apparent from the following description, wherein reference is made to the drawings, in which.

Figure 1:
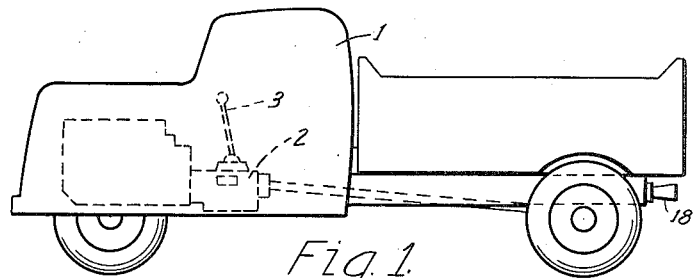
Fig. 1 is a diagrammatic side elevation of a conventional automotive truck showing schematically the system of the present invention installed thereon.

Referring to the drawings, there is illustrated the conventional truck 1 having a manually shiftable transmission gear mechanism 2 of which the reverse drive is operated by a manually controlled lever 3.

In such a transmission, the shifting of the gears for different speeds and for reverse is usually accomplished by means of slide rods mounted within the housing of the transmission and operated by one or more external operating levers, such as the lever 3 above described.

Figure 2:
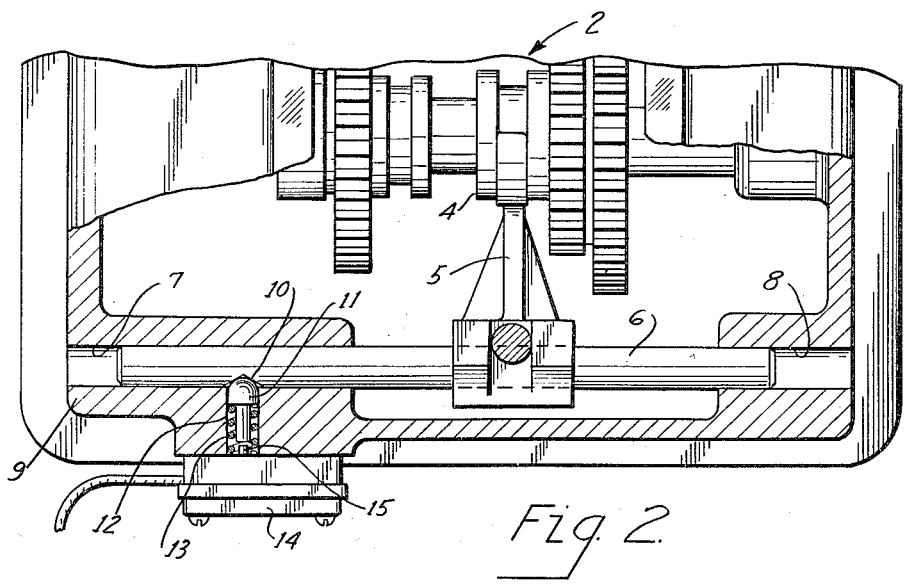
Fig. 2 is an enlarged fragmentary horizontal longitudinal sectional view through a gear shift type of change speed transmission customarily used on automotive trucks, showing in greater detail the manner of associating the control parts of the present system therewith; and, Fig. 3 is a wiring diagram illustrating the present system.

In the form illustrated in Fig. 2, the gear to be shifted for reverse drive is shifted by means of a collar 4 which is engaged by a yoke 5 mounted in fixed position on a shifting rod 6 which is slidable axially in suitable bores 7 and 8 in the gear transmission housing 9 of the mechanism. The lever 3, at its inner end is operatively connected to the yoke 5 and rod 6 in a well-known manner for shifting them axially of the rod 6 to reverse drive and neutral positions, selectively.

As is usual in such instances, the rod is provided with a notch 10 which is arranged to be engaged by a spring seated detent 11 when the rod is in final position in which reverse drive is provided. In conventional transmissions, the detent 11 operates in a bore 12 in the housing 9 and is yieldably held in seated position by a spring 13. Regardless, therefore, of whether the lever 3 becomes bent or damaged exteriorly of the housing 9, it can shift the reversing part of the transmission only by shifting the rod 6 exactly into proper position. The structure thus far described is well-known in the art.

In the present invention, a micro switch 14 having an operating button 15 is fastened onto the housing in a position in which its operating button is positioned in the bore 12 so as to be protected by the bore wall and so as to be engaged and moved endwise of the bore by the detent 11 to open and close the switch. Such commercially available microswitches can be wired to "make" contact when the button is pressed "in" and to break contact when the button is released, or the reverse.

In the present invention, the circuit is connected to those terminals of the switch which are "on" or "closed" when the button is released and "off" or "open" when the button is pushed in. As illustrated in Fig. 2, when the rod 6 is positioned axially so that the detent 11 is seated in the notch 10, the transmission is in reverse drive. At the same time, the button 15 is unrestrained by the detent 11 and the switch is closed for energizing the signal system. On the other hand, when the reverse lever 3 is shifted and thereby shifts the rod 6 to a position in which the reverse drive is discontinued, then the detent rides on the normal periphery of the rod 6 and thereby is moved outwardly against the button 15 and depresses the button so as to open the switch 14 and deenergize the signal system.

It is apparent that, since the switch 14 is secured on the housing 9 in fixed position, the danger of its being displaced or rendered improperly operative is quite remote.

Furthermore, the push button 15 of the switch 14, which is the only movable part exposed externally of the switch, is well protected within the bore 12.

The detent which operates the push button is substantially that customarily provided for such transmission shift rods and is so arranged that it cannot be propelled forcibly against, or jammed too tightly against, the push button 15, or caused to move in any manner which might destroy or damage the switch mechanism or cause it, itself, to be damaged. The installation does not require any changes in the existing structure of the transmission.

Figure 3:
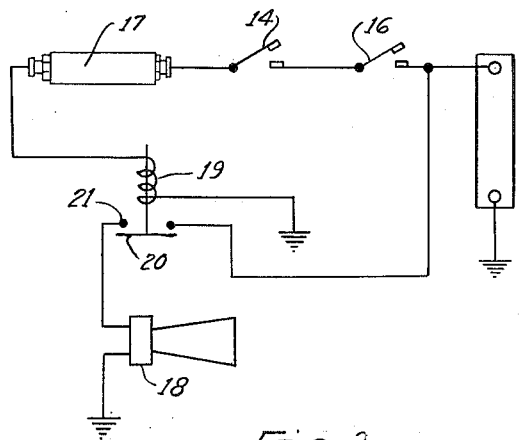

Referring next to Fig. 3, there is shown a wiring diagram for the installation. As there shown, the system includes a circuit in which the microswitch 14 is connected in series with the ignition switch 16 and with a make and break device 17 which, when energized, is adapted to make and break a circuit intermittently.

The signal shown for purposes of illustration comprises an electric horn 18. Since such horns draw a considerable amount of current and this current would, if the horn were directly in the circuit, have to pass through the make and break device 17, the latter would have to be very large and somewhat expensive. Instead, therefore, the horn is operated intermittently by means of a relay 19 having contacts 20 engageable with contacts 21 for opening and closing a circuit through the horn directly from the battery. The relay shown is a normally open relay which closes the circuit through the horn when the control circuit is energized by closure of the ignition switch 16 and the microswitch 14. The microswitch 14, ignition switch 16, device 17, and relay 19 are connected in series with each other in a control circuit and one side of this control circuit is connected to the battery and the other side to a ground.

The operating circuit for the horn 18 likewise has one side connected directly to the battery and the other side directly to a ground. The circuit is shown in Fig. 3 in the condition in which it appears when the reversing gear is set in inoperative position. When the ignition switch 16 is closed, the circuit is in condition for operation except for the microswitch 14 which is normally open.

When the reversing rod 6 is shifted to operative position for reverse drive, the microswitch 14 is closed whereupon the control circuit is energized and causes the horn to operate intermittently so long as the reverse drive is connected for operation.

The automatic make and break device 17 may be any one of the conventional light "flashers", a large number of which are available on the market and many of which include resistors operating a thermostatic make and break switch. The type of flasher used is relatively unimportant except from the standpoint of cost. From this standpoint, and for greater safety, it is desirable that the flasher used be one requiring very low voltage and supplemented by a relay, as illustrated.

It is apparent from the foregoing description that the control system of the present invention is safe, that the operating parts are so arranged that there is little likelihood of their being damaged in any way by any improper operation by the operator, and as mentioned, that it can be installed without any appreciable change in the existing structure of present day automotive trucks.

Having thus described my invention, I claim:

1. In a combination including a vehicle change speed power transmission including a housing, a reverse drive transmission means in the housing, a shifting rod mounted in the housing for axial movement, means operatively connecting the rod and the reverse drive transmission means for shifting the reverse drive transmission means to reverse drive and neutral positions, selectively, by the rod upon axial movement of the rod to different positions, selectively, means for shifting the rod to said different positions, selectively, a switch movable to open and closed positions, an electric signal device, circuit means connecting the switch to said device for causing energization of the device when the switch is in one of said positions, said housing having an outer wall with a passage therethrough, a hollow body enclosing the switch and having a passage therein, a switch operating button extending to the outside of the body through the body passage, means securing the body in fixed position relative to the housing in closing relation to the outer end of the housing passage and with said button extending into said housing passage, and switch operating means in the housing and operated by the rod and operatively mechanically connected to the switch for moving the button to said one position when the rod is moved into the position in which the transmission is in reverse drive.

2. In a combination comprising a vehicle transmission including a housing, a reverse drive transmission means in the housing, a shifting rod mounted in the housing for axial movement, means operatively connecting the rod and the reverse drive transmission means for shifting the reverse drive transmission means to reverse drive and neutral positions, selectively, by the rod upon axial movement of the rod to different positions, selectively, means for shifting the rod to said different positions, selectively, said rod having a detent notch, said housing having a passage therein extending generally transversely of said rod and opening at its inner end at the circumference of the rod in position so that said notch may be aligned and disaligned therewith when the rod is shifted to said different positions, respectively, a detent in said passage and movable axially thereof and seatable in said notch in the axial position of the rod in which the transmission is in reverse drive, and movable by the rod outwardly from said notch in all other positions of the rod, means yieldably urging the detent toward the circumference of the rod, a switch, a hollow body enclosing the switch and having a passage therein, the switch operating button extending to the outside of the body through said body passage, means securing the body in fixed position relative to the housing with said operating button exposed in said housing passage and operatively engageable by the detent when the detent moves outwardly, for operating said switch from one position to another position, an electric signal device, circuit means operatively connecting the switch and said device for effecting energization of said device consequent upon said switch being placed in said one position.

References Cited in the file of this patent

UNITED STATES PATENTS

| | | |
|---|---|---|
| 1,825,917 | Obee | Oct. 6, 1931 |
| 2,431,117 | Hadley | Nov. 18, 1947 |